J. A. McCULLOCH.
PIPE JOINT.
APPLICATION FILED FEB. 26, 1913.

1,251,901.

Patented Jan. 1, 1918.

WITNESSES
R D Little
W. C. Lyon

INVENTOR
John A McCulloch
by Linthicum Belt & Fuller
his Attorneys

UNITED STATES PATENT OFFICE.

JOHN A. McCULLOCH, OF McKEESPORT, PENNSYLVANIA, ASSIGNOR TO NATIONAL TUBE COMPANY, OF PITTSBURGH, PENNSYLVANIA, A CORPORATION OF NEW JERSEY.

PIPE-JOINT.

1,251,901.          Specification of Letters Patent.         Patented Jan. 1, 1918.

Application filed February 26, 1913. Serial No. 750,856.

*To all whom it may concern:*

Be it known that I, JOHN A. McCULLOCH, a citizen of the United States, residing near McKeesport, in the county of Allegheny and State of Pennsylvania, have invented a new and useful Pipe-Joint, of which the following is a specification.

My invention relates to the construction of the joints employed in connecting the ends of metal pipes, and more particularly relates to the class of pipe joints used in connecting the ends of wrought metal pipes or tubes employed in forming pipe lines for conveying natural gas, water, oil, and similar fluids.

One object of the invention is to provide a pipe joint of cheap and simple construction having novel means whereby the adjoining ends of the pipe members forming a pipe line are securely fastened together and tight joints are obtained between the abutting ends of the pipes.

Another object of my invention is to provide a pipe joint of novel construction having improved means whereby the gasket or gaskets are compressed tightly in place in forming a tight joint and leakage is avoided and overcome.

A further object of my invention is to provide a pipe joint having improved means whereby limited angular and endwise movements of adjacent joined pipes are made possible without impairing the tightness of the joint.

A still further object of my invention is to provide a pipe joint of improved construction which is tight and flexible and prevents separation of the joined pipes.

Still further objects of the invention will appear as the invention is more fully described and claimed hereinafter.

Figure 1:
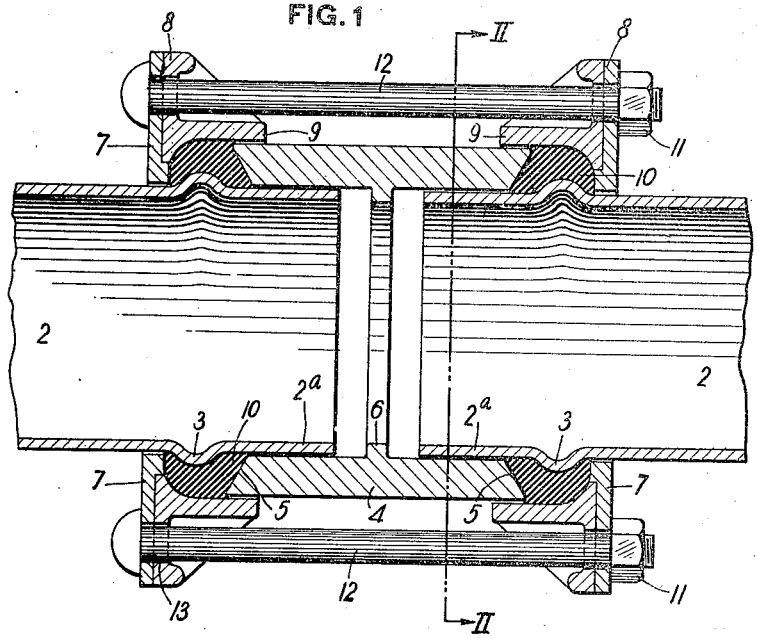

Referring to the accompanying drawings forming part of this specification, Figure 1 is a sectional plan showing a pipe joint constructed and arranged in accordance with my invention.

Figure 2:
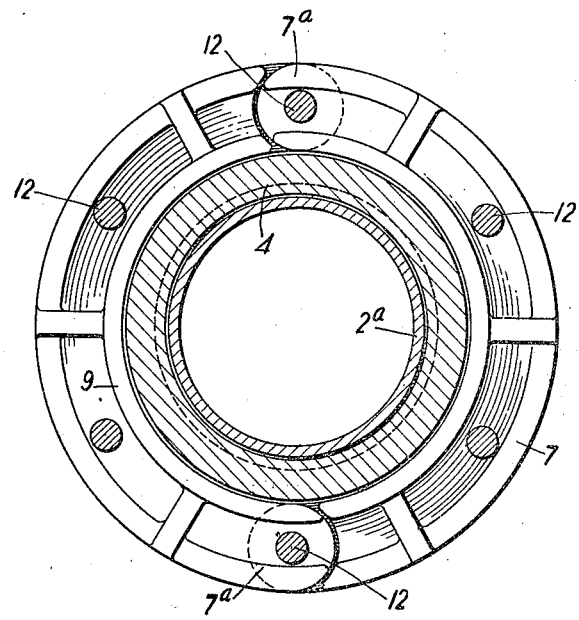

Fig. 2 is a transverse section of the same, the section being taken on the line II—II of Fig. 1.

In the drawings, the numeral 2 designates the ends of pipe members as connected in forming a pipe line and between which a joint is made in accordance with this invention. An annular bead 3 is formed on the ends of the pipes 2, adjacent to each end of each pipe by outwardly expanding the wall of the pipe. Between the beads 3 on the ends of adjoining pipes, a thimble or sleeve 4 is placed, the ends of the sleeve telescoping over the cylindrical end portions 2ª of the pipes 2. The beveled ends 5 of the sleeve 4 extend at an oblique angle to the outer surface of the sleeve and on the interior of the sleeve at about the middle of its length an inwardly projecting annular flange or rib 6 is formed, the width of this rib corresponding approximately to the thickness of the wall of the pipes 2, so that the inner diameter of the rib 6 is about the same as the inside diameter of the pipes.

The beveled ends of the sleeve 4 extend over the ends of the pipes 2 into proximity to the beads 3 and on the opposite side of each bead 3 a flange 7 is placed. The flanges 7 have cylindrical portions 8 and inwardly extending tubular portions 9, the tubular portions 9 of each flange being arranged to telescope over the adjacent end of the sleeve 4 surrounding the end of the pipes 2.

Within the recess formed by the adjacent beaded wall of the pipe 2, the beveled end of the sleeve 4 and the tubular portion 9 of the flange 7, a gasket 10 formed of rubber or other compressible material is placed, which is then compressed tightly within this space by adjusting the nuts 11 on the bolts 12 and forms a tight joint within the so-formed recess between the ends of the sleeve and the end of the adjoining pipe.

A series of registering openings 13 are provided in the outwardly standing legs 8 of the flanges 7 for the bolts 12 which are employed to connect the flanges 7 and in compressing the packing used in forming a tight joint between the ends of the pipes 2 and when the flanges 7 are split or made in sections as shown, two of these bolts 12 are conveniently used to connect the overlapping end portions 7ª of the split flanges 7 and in securing the flanges in place on the pipes 2. When found necessary or desirable the flanges may be made solid or in one piece, in such case being placed on the pipes prior to expanding the walls of the pipes in forming the beads 3.

In constructing a joint like that illustrated the parts are assembled as shown and the nuts 11 on the bolts 12 are then adjusted to draw the flanges 7 toward each other and thereby compress the gaskets 10 tightly into contact with the surface of the pipes 2 and the ends of the sleeve 6.

As the gasket is arranged to surround the outer surface and extend on opposite sides of the annular beads 3 on the ends of the pipes 2, the gasket is forced into close contact with the surfaces of the sleeve, the flanges 7 and the pipe, when tightened in position as shown in Fig. 1.

The advantages of my invention result from provision of the integral beads on the metal pipes and the arrangement and location of the packing material or gasket with respect to the annular beads. The beads on the pipe provide a positive connection between the ends of the pipes and the flanges which prevents separation of the pipes. The flanges, with the walls of the telescoped ends of the pipes, form a recess in which the gasket is inclosed so as to permit of a limited angular and slight endwise movement of one pipe relative to that to which it is connected without impairing the tightness of the joint formed between the ends of the joined pipes.

Many variations may be made in the form and arrangement of the sleeve and flanges forming part of my improved pipe joint, within the scope of the appended claims.

I claim:—

1. In a pipe joint, the combination of a sleeve, pipes having integral beads adjacent to the ends thereof with said ends telescoping within the sleeve, flanges having tubular projections telescoping over the ends of said sleeve, said pipe ends, flanges, and sleeve coacting to form packing recesses at the ends of the sleeve, a compressible packing covering the annular bead within each recess, and bolts connecting said flanges, said bolts being arranged to cause a relative approach of said flanges and thereby compress the packing material around the beads and form a tight joint between the connected pipe ends and sleeve.

2. In a pipe joint, the combination of a sleeve, pipes having integral beads adjacent to the ends thereof with said ends telescoping within the sleeve, transversely divided sectional flanges having tubular projections telescoping over the ends of said sleeve, said pipe ends, flanges, and sleeve coacting to form packing recesses at the ends of the sleeve, a compressible packing covering the annular bead within each recess, and bolts connecting said flanges, said bolts being arranged to cause a relative approach of said flanges and compress the packing material around the beads and thereby form a tight joint between the connected pipe ends and sleeve.

3. In a pipe joint, the combination of a sleeve, pipes having integral beads adjacent to the ends thereof with said ends telescoping within the sleeve, means on the interior of said sleeve extending between the abutting ends of said pipes to limit lengthwise movement of the sleeve on said pipe ends, flanges having tubular projections telescoping over the ends of said sleeve, said pipe ends, flanges, and sleeve coacting to form packing recesses at the ends of the sleeve, a compressible packing covering the annular bead within each recess, and bolts connecting said flanges, said bolts being arranged to cause a relative approach of said flanges and thereby compress the packing material around the beads and thereby form a tight joint between the connected pipe ends and sleeve.

In testimony whereof, I have hereunto set my hand.

JOHN A. McCULLOCH.

Witnesses:
   Jos. T. Armstrong,
   R. E. Porter.